Dec. 18, 1923.  
E. M. WOODWORTH  
INDICATOR FOR CAMERAS  
Filed July 18, 1922

WITNESSES

INVENTOR  
Edward M. Woodworth  
BY  
ATTORNEYS

Dec. 18, 1923.
E. M. WOODWORTH
1,478,318
INDICATOR FOR CAMERAS
Filed July 18, 1922   3 Sheets-Sheet 2
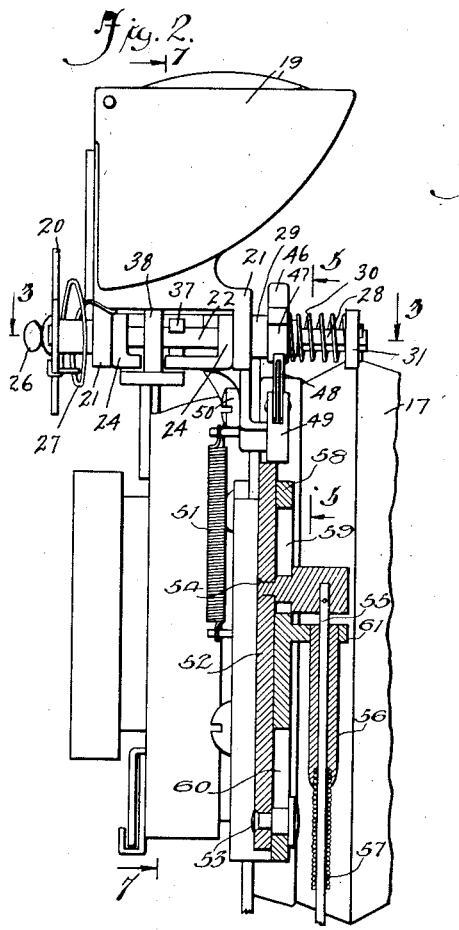
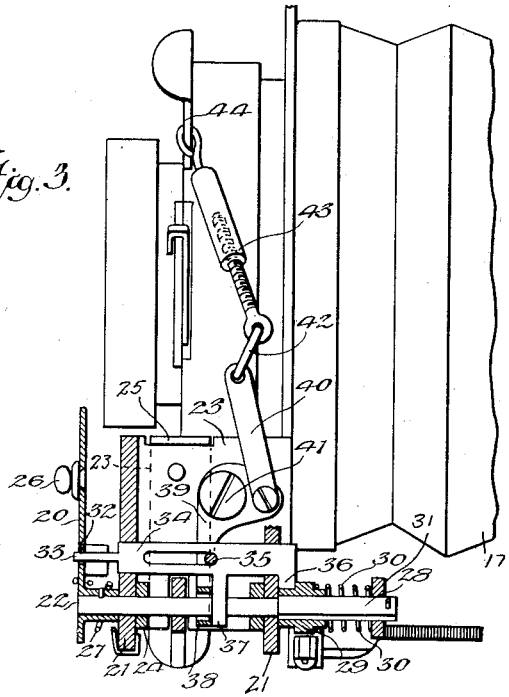
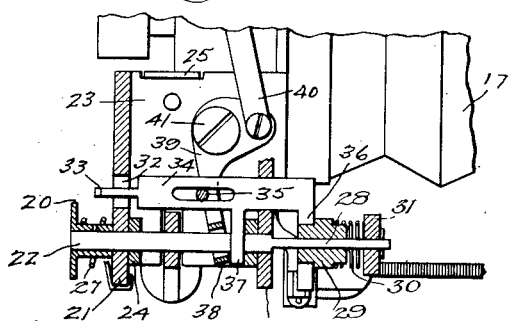
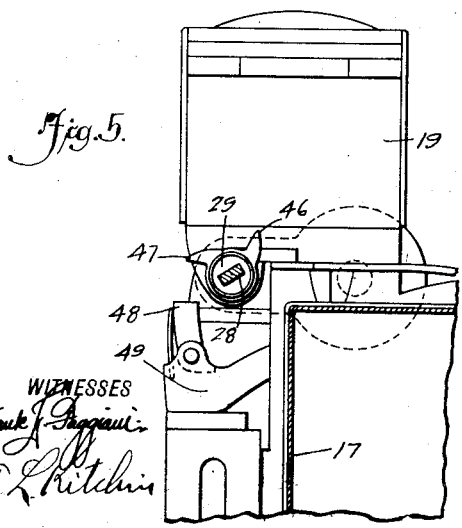
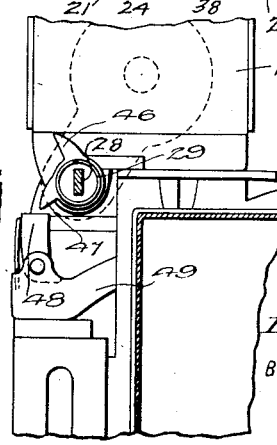
INVENTOR
E. M. Woodworth
ATTORNEYS Dec. 18, 1923.  
E. M. WOODWORTH  
INDICATOR FOR CAMERAS  
Filed July 18, 1922    3 Sheets-Sheet 3  
1,478,318
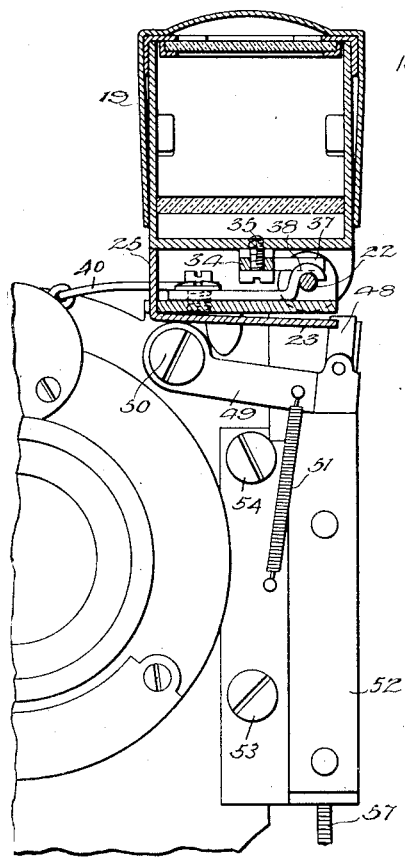
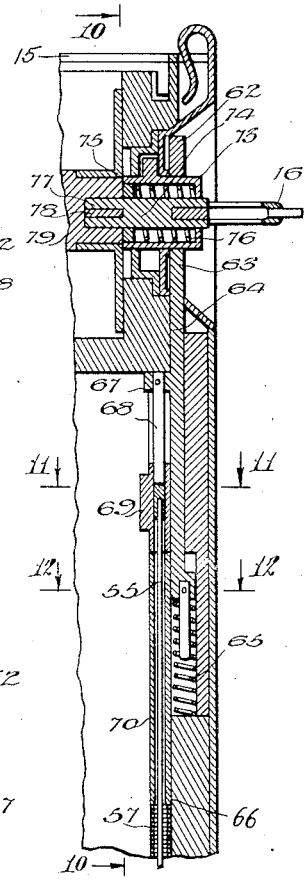
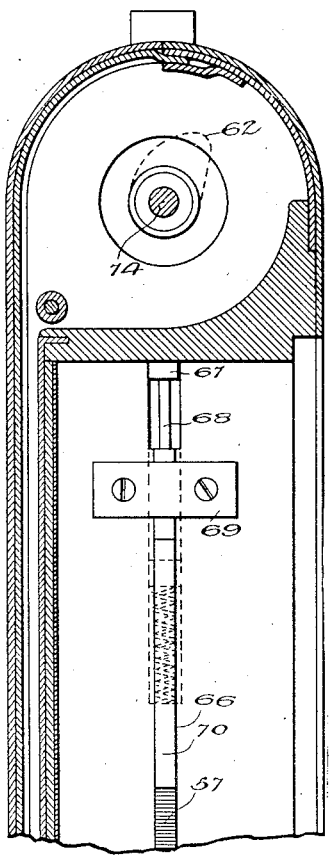
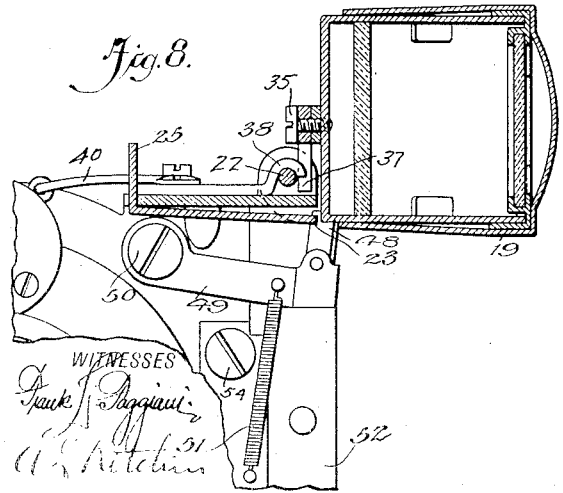
INVENTOR  
Edward M. Woodworth  
BY Munn & Co.  
ATTORNEYS Patented Dec. 18, 1923.

1,478,318

UNITED STATES PATENT OFFICE.

EDWARD MOREY WOODWORTH, OF ROCHESTER, NEW YORK, ASSIGNOR OF ONE-FOURTH TO CHAUNCEY C. WOODWORTH, OF NEW YORK, N. Y.

INDICATOR FOR CAMERAS.

Application filed July 18, 1922. Serial No. 575,828.

*To all whom it may concern:*

Be it known that I, EDWARD M. WOODWORTH, a citizen of the United States, and a resident of Rochester, in the county of Monroe and State of New York, have invented a new and Improved Indicator for Cameras, of which the following is a full, clear, and exact description.

This invention relates to cameras and particularly to an indicating device for indicating when the film has been changed or advanced.

The object of the invention is to provide a simple, positive operating indicating mechanism which necessitates advancing of the film before a new picture can be seen through the finder of the camera.

Another object is to provide an indicator which will operate with the camera either in a vertical or a horizontal position.

An additional object is to provide an indicating mechanism for indicating when the film has been turned which is shifted automatically to a set position when the film has been properly turned and which may be shifted to a set position manually without turning so that upon the intervention of the operator, the indicator may be moved at any time while ordinarily it is moved automatically at the time the film is shifted.

In the accompanying drawings—

Figure 2 is an enlarged fragmentary side elevation of the front part of the camera shown in Figure 1 with part of the invention applied thereto and with certain parts shown in section for better illustrating the construction.

Figure 3 is a fragmentary sectional view through Figure 2 on line 3—3.

Figure 4 is a view similar to Figure 3 but with the parts in a different position.

Figure 5 is a fragmentary sectional view through Figure 2 on line 5—5.

Figure 6 is a view similar to Figure 5 but showing the parts in a different position.

Figure 7 is a sectional view through Figure 2 on line 7—7.

Figure 8 is a view similar to Figure 7 but showing the parts in a different position.

Figure 9 is a fragmentary sectional view on an enlarged scale, through Figure 1 approximately on line 9—9.

Figure 10 is a sectional view through Figure 9 on line 10—10.

Figure 11 is a fragmentary transverse sectional view through Figure 9 on line 11—11.

Figure 12 is a fragmentary transverse sectional view through Figure 9 on line 12—12.

Figure 1:
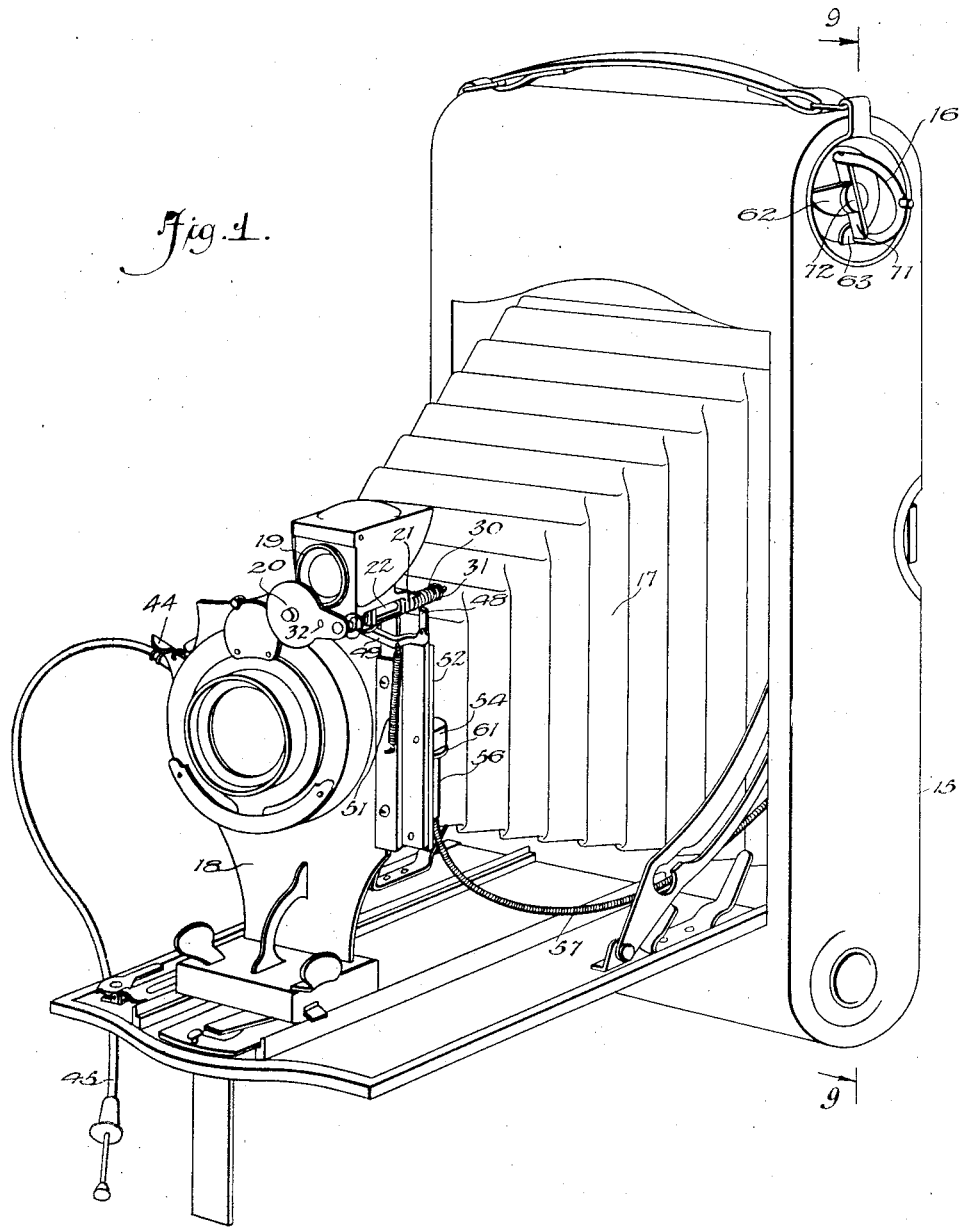
Figure 1 is a perspective view of a camera with an embodiment of the invention applied thereto.

Referring to the accompanying drawings by numeral, 15 indicates a camera of any usual or preferred kind, as for instance, an ordinary film camera wherein the film is mounted on a suitable roller and is unwound as used, by a suitable hand operated member 16 which rotates a suitable roller. The camera 15 is provided with the usual bellows 17 which in turn is provided with the usual front piece 18 carrying the lens and associated parts including a finder 19.

As is well known, an operator oftentimes forgets to turn the member 16 for presenting a new exposure of the film after having snapped the shutter. Various means have been suggested to overcome this human weakness, said structures being more or less successful. In the present invention an improved structure has been provided which accomplishes in a very efficient manner the desired result. One embodiment of the invention has been shown in the accompanying drawings which presents means for automatically shutting off the finder after each exposure; also means for automatically uncovering the finder when a new exposure has been moved to a correct position in back of the lens. In addition to these automatic features, the shutter or closing blade for the finder is so designed and mounted as to be manually shiftable whenever desired. As is common in cameras of the kind shown in the drawings, the finder 19 may be used in the vertical position as shown in Figure 1 or may be moved over to a horizontal position as shown in Figure 8. The shutter 20 and associated parts are so constructed and mounted as to operate with the finder in either of the two positions mentioned.

The finder 19 is provided with suitable depending lugs 21 which are provided with apertures through which the shaft 22 extends. In this way, the finder is rotatably mounted on shaft 22 which shaft is supported on the platform 23 which platform is formed integral with or rigidly secured to the front 18. The finder 19 is provided with depending walls which are in fact extensions of the ears 21 so that there will be a small chamber at the bottom of the finder. The platform 23 is provided with ears 24 through which the shaft 22 passes, said ears being at one end of the platform 23 and at the opposite end there is provided an upstanding support 25 on which one end of the finder rests when in one position. The shaft 22 is rigidly secured by a suitable pin or other means to the shutter 20 which shutter is provided with a hand operated knob 26 and which is urged to a position in front of the lens of the finder by a spring 27 which spring is coiled around the hub of the shutter 20 and has one end acting against the shutter and the other end against one of the ears 21. The shaft 22 is provided with a flattened section 28 on which a sleeve 29 slides, said sleeve having an opening corresponding in shape to the flattened section whereby the sleeve may freely reciprocate on the flattened section but cannot rotate independently thereof. A spring 30 acts on sleeve 29 to move the same in one direction and on a suitable stop 31 secured to the outer end of the flattened section. When the shutter 20 is moved manually or automatically as hereinafter fully described to the position shown in Figure 1, the movement of the shutter will rotate the shaft 22 and also bring the aperture 32 into alignment with the locking pin or extension 33 of the slide 34. This slide is guided by a suitable screw or pin 35 and is urged outwardly by the spring 30 which acts to slide the sleeve 29 and said sleeve in turn moves the slide 34 by reason of the extension 36 projecting into the path of movement of part of the sleeve 29. Though the spring 30 acts to move the slide 34 and the pin or extension 33 so as to lock the shutter 20 open, this spring will not interfere with the rotation of the shaft 22 when the pin 23 has been moved out of engagement with the shutter 20. This latter movement is caused either automatically or manually through the action of certain parts hereinafter fully described.

The slide 34 is provided with an apertured extension 37 through which the shaft 22 loosely extends, said shaft also extending loosely through a hook 38 preferably formed integral with the one leg of the bell crank lever 39, the opposite leg of said bell crank lever being pivotally connected to a link 40. The bell crank lever 39 is pivotally mounted on the platform 23 by a suitable screw 41. Whenever the link 40 is pulled in one direction, the hook 38 will be moved toward the spring 30 and will, consequently, push the extension 37 and the slide 34 a sufficient distance for disengaging the pin 33 from the shutter 20 whereby said shutter will be quickly rotated to a closed position in front of the lens of the finder 19, said movement being caused by the spring 27. The link 40 is connected by a second link 42 to the turnbuckle structure 43 which in turn is connected in any suitable manner with the hand operated lever 44 forming part of the camera. The lever 44 is the lever which permits a manual actuation of the shutter of the camera and the detail structure thereof forms no part of the present invention.

It will be noted that the shutter of the camera may be operated either by the lever 44 or by a Bowden wire structure 45. When the parts are in the position shown in Figure 1 and the shutter lever 44 or the Bowden wire structure 45 is actuated in order to make an exposure, the movement of the lever 44 will cause the link 40 and associated parts to be pulled and, consequently, will cause the pin 33 to release the shutter 20 whereupon the shutter will move in front of the finder 19 substantially simultaneously with the making of the exposure. If desired, the shutter 20 could be manually opened or moved to the position shown in Figure 1 though ordinarily this is not done. In case the operator forgets to shift the film and desires to take a second picture he will be unable to use the finder by reason of the closed position of the shutter 20. This will be an indication or notice that the film has not been changed and he will thereupon operate the hand member 16 for shifting the film. When this is operated, mechanism hereinafter fully described will be also operated for automatically moving the shutter 20 to the position shown in Figure 1 as the film is shifted. From this it will be seen that the camera may be used in the usual manner and no attention need be made to the operation of the indicating means as it will automatically uncover the finder when a new section of film is in proper position for another exposure.

The sleeve 29 is provided with a pair of projections or stops 46 and 47 co-acting with a spring pressed pawl 48. This pawl is pivotally mounted on an arm 49 which in turn is pivotally mounted at 50 (Figure 7) on the front 18, said arm 49 being normally held in a lowered position by a retractile spring 51. The arm 49 is raised by a slide 52 provided with a pair of guiding pins 53 and 54 (Figure 2), guiding pin 54 being secured to one end of the wire 55 which wire extends through the guiding sleeve 56 and also through the coiled guide wire 57, which coiled guide wire, together with the wire 55, presents a Bowden wire structure for conveying reciprocatory motion from the parts associated with member 16 to the slide 52. The guide pins 53 and 54 are provided with enlarged heads fitting against the stationary plate 58 which plate is provided with suitable slots 59 and 60 through which the pins respectively project. The plate 58 is provided with a lug or extension 61 to which the guiding sleeve 56 is rigidly secured. When the member 16 is operated for moving the wire 55 for elevating the slide 52, said slide in turn will elevate the lever 49 and pawl 48. As the pawl 48 moves upwardly, it will strike the lug 47 (Figure 6) and will rotate the sleeve 29 until the pin 33 may move into the aperture 32. This is true where the finder is in a vertical position as shown in Figures 5, 6 and 7. Where it is in a horizontal position as shown in Figure 8, the lug 46 will act instead of lug 47.

In order that the hand operated member 16 may properly actuate the wire 55, mechanism has been provided as shown particularly in Figures 1 and 9 to 12 inclusive. As shown in Figure 1 the member 16 is provided with a cam 62 which cam is positioned to engage the upper end 63 of a slide bar 64 and depresses the same against the action of spring 65. This slide and the spring 65 are arranged in suitable cut-out portions in the casing of the camera which camera is also provided with a slot 66 in which the projection 67 of slide 64 moves, said projection being rigidly secured to the end of the rod 68 which rod is slidingly guided in a suitable bracket 69 and which is rigidly secured to the end of wire 55, said wire 55 being guided for part of its distance by the tube 70 and the remaining part of the distance by the wire winding 57.

As indicated in Figures 1 and 9 the hand operated member 16 is provided with a transverse blade 71 fitting into a suitable slot 72 in a drum 73, said blade 71 being rigidly secured to a shaft 74, which shaft has a stop 75 connected therewith so that when the member 16 is pulled outwardly, said stop will compress the spring 76 and said spring in turn will tend to return the parts to their former position with the bifurcated end 77 of shaft 74 straddling the bar 78 connected with the usual roller 79 of the camera. It will thus be seen that the usual connections are maintained for the roller while the cam 62 and associated parts perform their functions automatically. It will be noted that in case the cam 72 should be rotated several times, which may be necessary to properly position the film, said additional rotation will not affect the shutter 20 as only the first rotation will actuate or move to an open position this shutter.

What I claim is:—

1. The combination with a camera having a shutter mechanism and a finder, of an indicator, comprising a shutter mounted to swing into and out of light obscuring position relative to said finder, manually actuated means for moving said last mentioned shutter out of light obscuring position, and both manually actuated and automatically actuated means for causing the last mentioned shutter to move into light obscuring position relative to the finder substantially simultaneously with the operation of the shutter of the camera.

2. In an indicator for cameras, a shutter for the finder of the camera, a rotatable shaft for supporting said shutter, a spring for moving the shutter to a light obscuring position relative to the finder, manually actuated means for moving the shutter to a non-light obscuring position, and means automatically actuated when the film of the camera is shifted, said means acting to rotate said shaft and move the shutter out of light obscuring position.

3. In an indicator for cameras provided with finders, a shutter for the finder, a plurality of means for moving the shutter out of light obscuring position, and means actuated by the shutter of the camera for causing the shutter co-operating with the finder to move into light obscuring position in respect to the finder.

4. In a device of the character described, a shutter, a rotatable shaft for said shutter, a spring for moving the rotating shaft in one direction, a sliding bar having a locking pin for locking the shutter in one position, a spring for sliding said bar to a locked position, and manually actuated means for sliding the bar to an unlocked position.

5. In an indicator of the character described, a shutter, a rock shaft rigidly secured to the shutter, said shutter being provided with an opening, a sliding bar provided with a pin, spring means for moving said bar so that the pin will project through said opening when the opening has been brought into registry therewith, a spring for moving the shutter to a finder securing position, automatically actuated means for rotating said shaft and shutter until said pin moves into said aperture, and manually actuated means for shifting the pin to a position out of said aperture.

6. In an indicator of the character described, a shutter for a finder, a shaft rigidly secured to the shutter, a spring for moving the shutter to a finder obscuring position, a locking mechanism for locking the shutter in a different position, means for moving said shutter to a different position, said means including a cam secured to the mechanism of the camera used in shifting the film, a sliding bar actuated by said cam, means for transmitting motion from the sliding bar to said shutter, and means for manually releasing said locking mechanism.

7. The combination with a camera having shutter mechanism and a finder, of an indicator, comprising a shutter mounted to swing into and out of light obscuring position relative to the finder, a spring for swinging said shutter into light obscuring position, means connected with the film shifting mechanism of the camera for swinging said shutter against the action of said spring to a position away from the light obscuring position, a spring pressed lock for locking the shutter in the last mentioned position, and a manually actuated mechanism for shifting the locking mechanism out of engagement with the shutter whereby said spring will swing the shutter to a light obscuring position.

8. The combination with a camera having a shutter mechanism and a finder, of an indicator comprising a shutter mounted to swing into and out of light obscuring position relative to the finder, a spring pressed bolt engaging said shutter for locking the same in one position, manually actuated means for disengaging said bolt from said shutter and thereby releasing it, a spring for swinging said shutter to a light obscuring position on the release by said bolt, and means connected to the film shifting mechanism of the camera for moving the shutter out of light obscuring position relative to the finder.

9. The combination with a camera having a shutter mechanism and a finder, of an indicator comprising, a shutter mounted to swing into and out of light obscuring position relative to the finder, manually actuated means for causing the shutter to move to a position into light obscuring position, and means operated from a point adjacent the roller of the camera for moving the shutter out of light obscuring position, said last mentioned means including a rotatable cam, a slide movable in one direction by said cam, a spring for moving said slide in the opposite direction, a power wire reciprocated by said slide, a second slide reciprocated by said power wire, and means including a pawl actuated by said second slide for swinging the shutter away from light obscuring position.

10. In an indicator device of the character described, a rotating shaft, a shutter connected with the rotating shaft, a sleeve slidably mounted on said shaft, but rotatable therewith, said sleeve having a pair of shoulders or abutments, a spring pressed pawl co-acting with said abutments, a reciprocating slide for moving said pawl in one direction, a spring for moving the pawl in the opposite direction, a power wire for operating said reciprocating slide, and means including a cam connected with the roller of the camera for actuating said power wire.

11. In an indicator of the character described, a shutter, a rock shaft rigidly secured to said shutter provided with a flat section at one end, a sleeve slidably mounted on said flat section, said sleeve being provided with a plurality of shoulders, means including a spring pressed pawl for engaging said shoulders for moving the shaft and shutter in one direction, and spring means for moving the shutter in the opposite direction.

EDWARD MOREY WOODWORTH.